Feb. 13, 1968   E. PETERS ET AL   3,368,724
PLASTICIZING-SCREW DEVICE
Filed March 18, 1966   2 Sheets-Sheet 1

Erhard Peters
Hans Reifenhäuser
Fritz Reifenhäuser
INVENTORS.

BY

Karl F. Ross
Attorney

United States Patent Office 3,368,724
Patented Feb. 13, 1968

3,368,724
PLASTICIZING-SCREW DEVICE
Erhard Peters, Hans Reifenhäuser, and Fritz Reifenhäuser, Troisdorf, Germany, assignors to Firma Reifenhauser KG., a corporation of Germany
Filed Mar. 18, 1966, Ser. No. 535,420
Claims priority, application Germany, Mar. 18, 1965, R 40,141
4 Claims. (Cl. 222—413)

ABSTRACT OF THE DISCLOSURE

A plasticizing screw for delivering plastified thermoplastic material to an extrusion or injection-molding press having a first axial section provided with at least one external helicoidal thread split longitudinally into a plurality of peripherally offset thread parts with spacedly overlapping ends, the perpendicular gap width S between the ends, the length L of peripheral overlap of the ends and the pitch angle $\varphi$ of the thread defined between the thread and a plane perpendicular to the axis of the feed screw being in the relationship:

$$L \geq \frac{S}{\tan \varphi}$$

and a second axial section between the first axial section and the outlet of the device provided with a pair of intertwined threads of different external diameters forming a relatively small clearance with the surrounding housing and a relatively large clearance therewith, respectively, whereby fully plasticized material flows readily over the smaller-diameter thread whereas substantially unplasticized material is retained thereby for further plastification.

---

Our present invention relates to an improved plasticizing and conveying device for thermoplastic synthetic resins and like comminuted materials adapted to be rendered fluid by mastication and plastification.

It is a common practice to provide extrusion presses (and injection-molding devices) with conveyor-type plasticizing screws adapted to effect a mixing and shearing action with compression upon a comminuted mass of a synthetic resin (e.g. a thermoplastic or other resinous material) while conveying this mass to the extrusion die of the press. In general, such plasticizing devices make use of at least one rotating worm or screw having helical formations in close-fitting relationship to a wall of a cylinder bore to continuously shear, squeeze and mix the comminuted material. It has been found to be advantageous to provide the worms with one or more of such formations (e.g. with a multiple thread or rib; and to interrupt the ribs or threads at axially spaced locations along the screw. In one arrangement, it was found advantageous to leave an axial gap between portions of the helical rib, but such an arrangement permitted back flow of the conveyed material and decreased the efficiency of operation while preventing self-emptying.

It is an important object of the present invention to provide an improved plasticizing-worm arrangement wherein the plasticizing efficiency and displacement of the comminuted plasticizable material is increased by comparison with earlier systems, which is capable of automatic discharge and clearing of the material from the worm, which delivers a plasticized mass of greater homogeneity, and which results in a higher degree of plasticization.

A further object of this invention is to provide a self-clearing plasticizing screw having an optimum plastification rate and a high conveying speed.

These objects and others which will become apparent hereinafter, are attained in accordance with the present invention, through the provision of a screw-type plasticizing press which comprises at least one worm characterized by a first axial section at the inlet side of the worm having a plurality of angularly offset and limited-length helical plasticizing threads or ribs in overlapping relationship and defining between them at the overlapping zones a gap narrower than the width of the root between the lands of the adjacent turns of each rib, and a second axial section forwardly of this first portion and preferably disposed between it and the outlet end of the worm which includes a pair of intertwined ribs of different outer diameter whereby the smaller-diameter rib serves as a weir retaining the insufficiently plasticized material while the fully plasticized mass flows over these portions and is advanced to the outlet side of the system. The gap width S between the overlapped portions of the ribs at the first portion of the worm is advantageously in a predetermined relation to the length of overlap L and the pitch angle. More specifically, we have found that the length L of overlap should be at least equal to the gap width S defined by the tangent of the pitch angle:

$$L \geq \frac{S}{\tan \varphi}$$

According to another feature of this invention, these first and second axial portions of the worm together make up at least half the length of the conveying portion of the worm and, preferably, each of these portions can constitute up to one half of the conveying portion. Advantageously, the overlapped part of the ribs of the worm can be constituted as described generally in the commonly assigned copending application Ser. No. 467,439 filed June 28, 1965 (now U.S. Patent 3,273,201, issued Sept. 20, 1966) by Fritz Reifenhäuser, one of the present joint inventors. As pointed out in that application, the extrusion-press plastifier should comprise a substantially cylindrical body provided with at least one external helicoidal thread or rib split longitudinally into a plurality of peripherally offset sections with spacedly overlapping ends extending at least to a common plane transverse to the axis of the body.

Advantageously, the spacing of the overlapping ends is substantially less than half the spacing of adjacent turns of the thread on either side of this plane and the length L of the overlap is not in relationship with the width S of the gap and the pitch angle $\varphi$ of both threads as set forth above. The advantages of such an arrangement reside not only in the prevention of rearward migration of the plastic mass as a consequence of the overlapping arrangement but also in an ensured self-clearing operation whereby the tendency of the plastic material to hug the rearward flanks of the threads is overcome. In fact, the interrupted arrangement of the threads ensures a highly satisfactory transfer of the plastic material from the rearward flanks of the rib to the forward flanks whereby partially plasticized material mixes thoroughly with the completely plasticized mass to ensure a homogeneous mixture and output. By providing a weir-like arrangement of intertwined threads forwardly of the intertwined length of conveyor thread, we have found that one obtains a type of feedback of incompletely masticated material and thus a circulation of all but the homogeneous and thoroughly plasticized portion which proceeds to the outlet. It is, consequently, possible to obtain a thorough and homogeneous plastification in a proportionately smaller length of conveyor worm that has been possible heretofore and to operate the entire system at a much higher rate (e.g. by increasing the worm speed). Furthermore, the arrangement permits an automatic discharge and clearing of the plasticizing device.

The above and other objects, features and advantages of the present invention will become more readily apparent from the following description, reference being made to the accompanying drawing in which:

FIG. 1a and FIG. 1b, taken together, constitute an elevational view of a plasticizing worm in accordance with the present invention;

Figure 1:
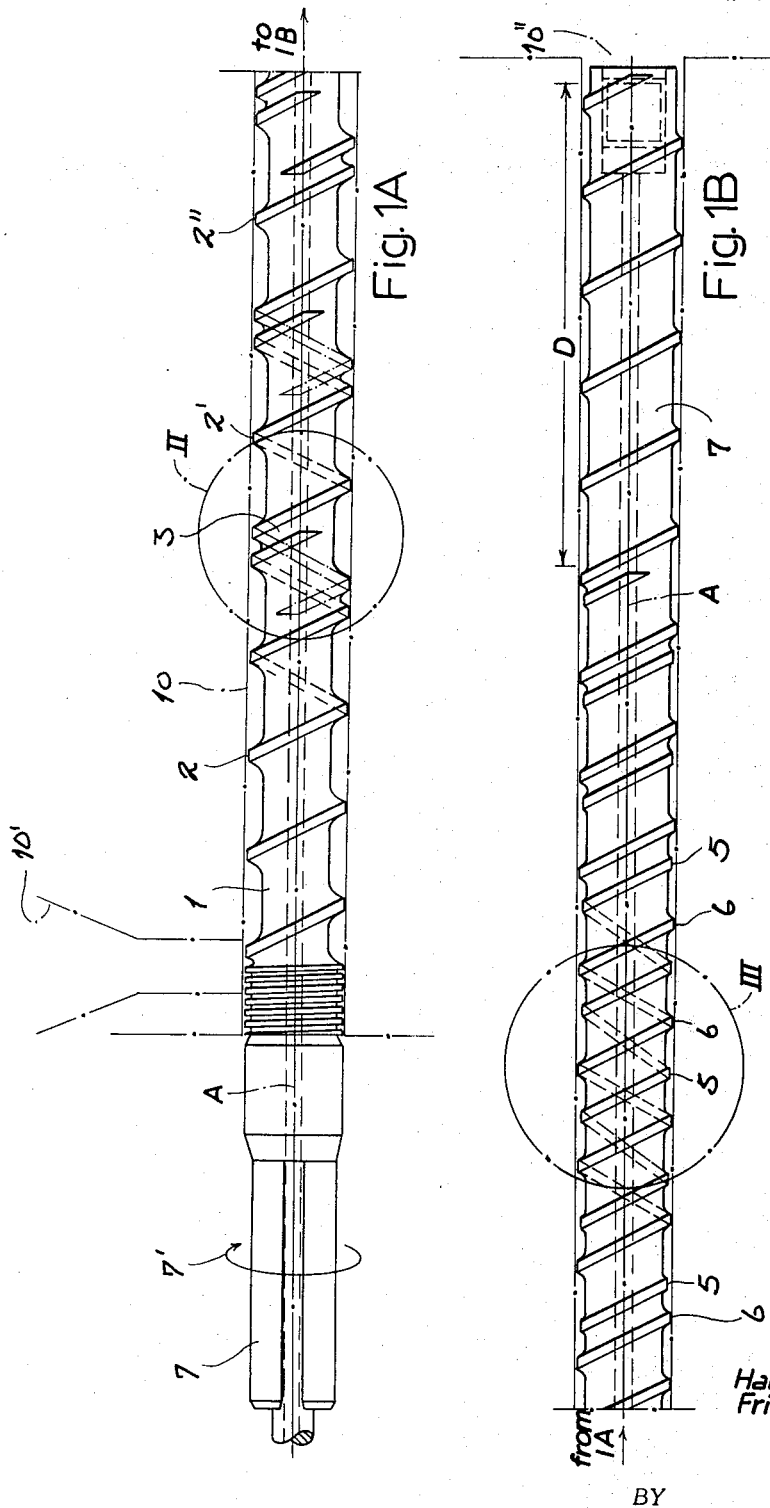

In FIG. 1 of the drawing, we show a plasticizing screw (generally designated 1) which is indicated in two portions at FIG. 1a and FIG. 1b for convenience of illustration, it being understood that the two portions are integral with one another and constitutes a single member. The cylindrical housing 10 (designated by dot-dash lines in FIG. 1) is provided with the usual heater means (not shown), if desired, a hopper or inlet 10' at the inlet end and an outlet 10" for delivering the plasticized material to the injection device of an injection-molding press or the extrusion nozzle of an extrusion press in the conventional manner. The shank 7 of the worm is journaled in conventional bearings and is keyed to a motor or other drive mechanism so that the rotation of the worm 1 in its cylindrical bore will advance the plastic material while egecting a masticating action thereon.

At the inlet side of the worm (FIG. 1a), the helical ribs, 2, 2', 2" etc. are axially and peripherally offset in mutually overlapping relationship but are of the same pitch angle $\varphi$ so that they define between them in the overlapping zones (e.g. as shown at zone II and FIG. 2), a spacing 3 with a gap width S measured perpendicularly to the threads in the region of overlapping. The perpendicular distance S between the ribs or threads 2 and 2', 2' and 2" etc. bears a relationship to the minimum length L of overlap and the pitch angle $\varphi$ such that $$L \geq \frac{S}{\tan \varphi}$$

The pitch angle $\varphi$ is here defined as the angle included between a plane P or P' perpendicular to the axis A of rotation of the worm and the thread 2 or 2'.

Figure 2:
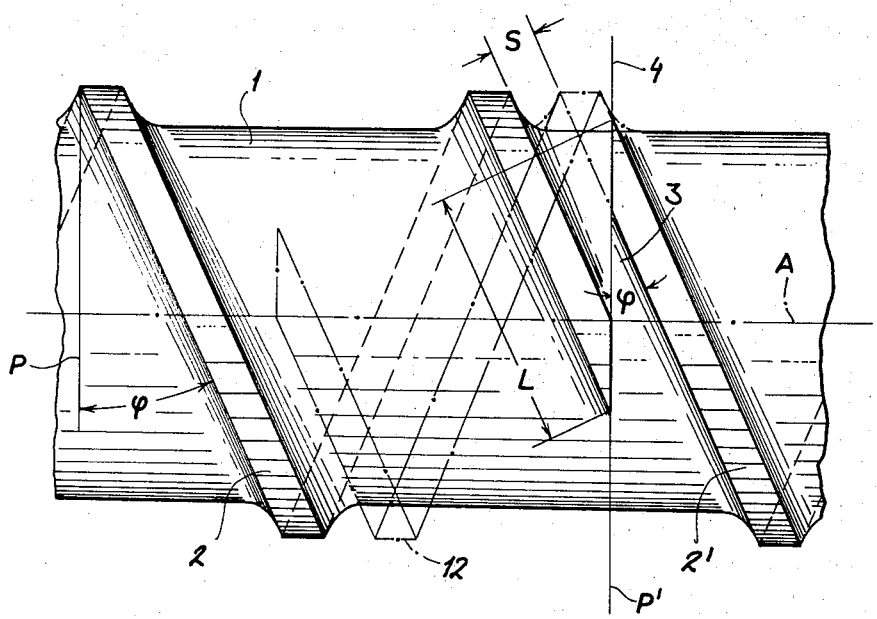
FIG. 2 is an enlarged detail view of the portion II of this worm.
Figure 3:
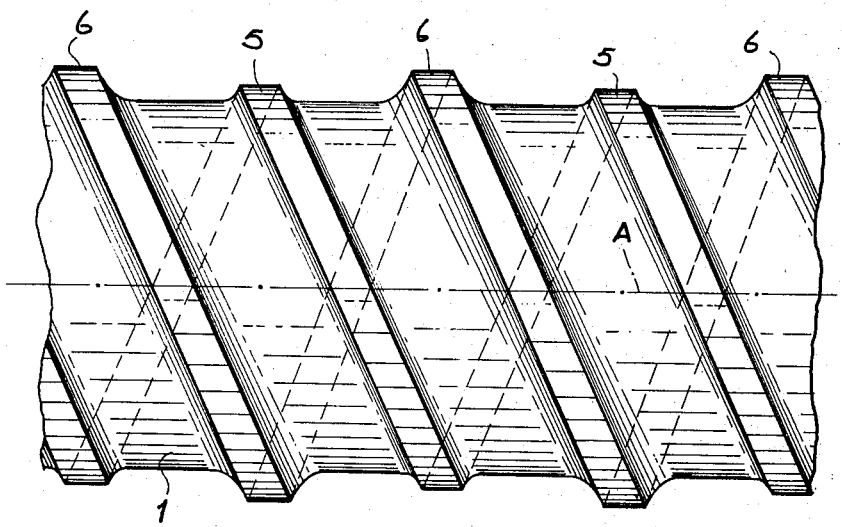
FIG. 3 is an enlarged view of the portion II thereof.

From FIG. 2, it will be evident that the successive threads 2 and 2' preferably pass through the plane P' at their overlapped region perpendicular to the axis A and that the length indicated by the relationship given above is merely a minimum. Thus the overlap can continue as represented by dot-dash lines 12 in FIG. 2 over an additional turn or fraction thereof of the threads.

At the outlet side of the worm (FIG. 1b) over another major fraction of the length of the worm and extending at least between the interrupted-thread initial portion and the discharge portion D, at least a pair of threads 5 and 6 of different outer diameter but identical pitch angle are disposed. The smaller-diameter thread 5 provides a greater play or clearance with the housing 10 than the larger-diameter thread 6 received within the housing with the usual clearance (see, for example, the aforementioned copending application) so that the thread 5 serves as a sort of weir over which the plasticized material flows without difficulty. It has been found that the larger-diameter thread 6 intercepts unplasticized material and feeds it back for mixture with the already plasticized mass to ensure a homogeneous mixing and plastification of the resin. The worm rotates in the direction of arrow 7' and advances the plastic mass to the outlet 10". It has been found further that there is little tendency for reverse flow of the plastic mass along the interrupted-thread initial portion (FIG. 1a) and that continued rotation of the worm drives substantially all of the plastic mass from the cylindrical bore in a self-emptying operation. Both the interrupted-thread portion and the weir-like portion constitute major fractions of the length of the worm and preferably can each make up approximately half the length of the conveying and plasticizing portion thereof.

At the transition region between the interrupted-thread portion and the weir portion of the worm, a merger between overlapping threads can be effected, with one of these threads being of progressively reduced diameter in the direction of advance of plastic material until a greater clearance with the housing is obtained.

The invention described and illustrated is believed to admit of many modifications within the ability of persons skilled in the art, all such modifications being considered within the spirit and scope of the appended claims.

We claim:

1. A plasticizing device for delivering plastified resinous material to a press, comprising a housing provided with a generally cylindrical bore, and a feed screw rotatable within said bore and extending axially therethrough from an inlet portion of said housing to an outlet portion thereof, said screw having:

a first axial section provided with at least one external helicoidal thread split longitudinally into a plurality of peripherally offset thread parts with spacedly overlapping ends, the perpendicular gap width S between the ends, the length L of peripheral overlap of said ends and the pitch angle $\varphi$ of said thread defined between said thread and a plane perpendicular to the axis of said feed screw being in the relationship $$L \geq \frac{S}{\tan \varphi}$$

and a second axial section between said first axial section and said outlet provided with a pair of intertwined threads of different external diameters forming a relatively small clearance with said housing and a relatively large clearance therewith, respectively, whereby fully plasticized material flows readily over the smaller-diameter thread whereas substantially unplasticized material is retained thereby for further plastification.

2. A device as defined in claim 1 wherein each of said sections extends over a major fraction of the length of said screw.

3. A device as defined in claim 2 wherein at least one of said sections extends over a length corresponding to substantially half the length of said screw.

4. A device as defined in claim 1 wherein said first section is provided with a multiplicity of peripherally offset threaded parts each having spacedly overlapping edges with corresponding gap width and peripheral overlap length.

References Cited

UNITED STATES PATENTS 3,180,525  4/1965  Fabian et al. _____ 222—412 X
3,184,112  5/1965  Loeser _____ 222—413 X M. HENSON WOOD, Jr., *Primary Examiner.*

ROBERT B. REEVES, *Examiner.*

H. S. LANE, *Assistant Examiner.*